United States Patent Office 2,823,350
Patented Feb. 11, 1958

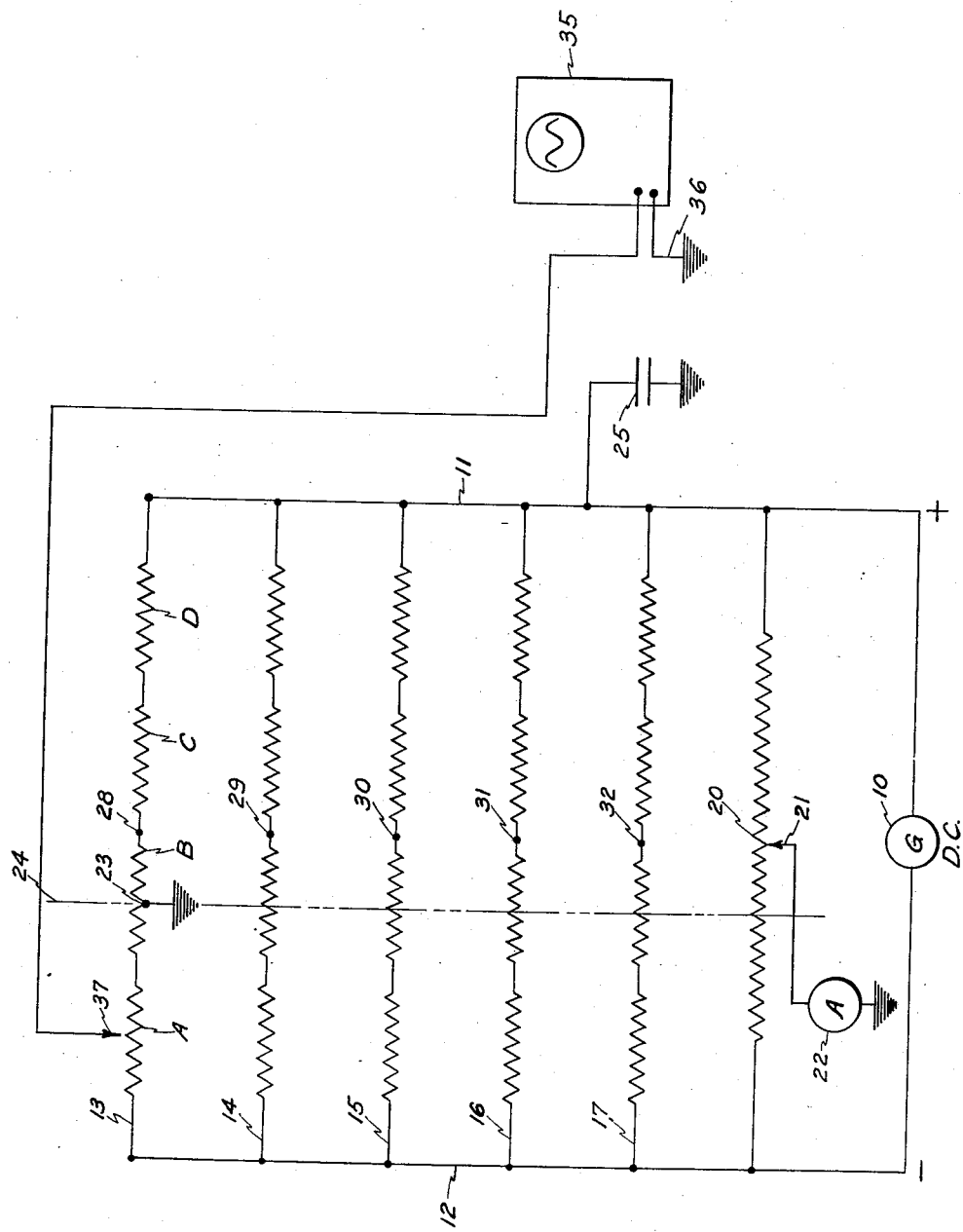

2,823,350

METHOD OF LOCATING GROUNDS

Kenneth Macleish, Oak Ridge, Tenn., assignor, by mesne assignments, to the United States of America as represented by the United States Atomic Energy Commission Application November 30, 1944, Serial No. 566,005

10 Claims. (Cl. 324—52)

This invention is concerned with methods for locating grounds in electrical circuits, particularly in D. C. circuit networks having a plurality of similar parallel branches.

The invention may be practiced in networks of the above type wherein the parallel branches consist of either a single electrical element or a group of electrical elements and the elements may be either coils or other types of impedance elements.

An object of the invention is to provide a convenient method of locating the point at which a ground may exist in a D. C. circuit.

Another object is to provide a method for locating a ground in a D. C. circuit energized by a D. C. generator which develops a ripple voltage at the commutator, by measuring the distribution of the ripple voltage along the circuit with one side of the circuit grounded through a condenser.

Another object of the invention is to provide a method for locating a ground in a circuit network of the type described above consisting in first locating the position of the ground with reference to the midpoint of the parallel branches, and then finding which branch the ground is in and the location of the ground in the branch by checking the ripple voltage in each branch with one side of the network grounded and measuring the distribution of the ripple voltage in the branch in which the ground is determined to be in to find the point in the branch at which the ripple voltage drops off to zero or substantially zero.

Another object of the invention is to provide a method for locating a ground in a D. C. circuit which consists in impressing a ripple voltage of a given frequency on the circuit and then measuring the distribution of the ripple voltage along the circuit with one side of the circuit grounded through a condenser to determine the point at which the ripple voltage drops off to zero or substantially zero.

Further objects of my invention and numerous of its advantages will become apparent from the following detailed specification and drawing which is a diagrammatic representation of a circuit network having parallel branches wherein the method of my invention may be practiced.

Referring to the drawing, the circuit network is shown as being energized by a D. C. generator 10 of known type, a characteristic of the generator being that it develops a ripple voltage at its commutator of a frequency of about 2,000 cycles per second. The generator 10 supplies power to lines 11 and 12 of the network and connected between lines 11 and 12 are parallel branches 13, 14, 15, 16 and 17. These parallel branches are electrically similar, each consisting of electrical elements A, B, C and D connected in series. The elements A, B, C and D may be windings forming inductances or they may be other types of electrical impedance elements. Obviously the circuit may have more than the number of parallel branches shown and there may be any number of elements connected in series in each branch. For example, the network shown diagrammatically in the drawing may be representative of the windings employed for producing the magnetic fields used with the isotope separating apparatus disclosed in detail in the application of Ernest O. Laurence, Serial Number 571,420, filed January 5, 1945, now Patent No. 2,721,272, granted October 18, 1955. In this application there is disclosed a number of individual isotope separating units arranged side by side in the form of a loop with a magnetic field associated with each unit. The electrical windings employed to produce the various fields are connected in the form of a network having parallel branches similar to the one shown in the drawing annexed hereto.

A ground may develop in any one of the elements A, B, C or D in any one of the parallel branches and it is desired that it be possible to locate the ground while the network is energized by the generator 10 since when the network is de-energized the ground may disappear so that it would not be possible to locate it.

In carrying out the method for precisely locating the ground, a potentiometer designated by numeral 20 is connected across the circuit, that is, between lines 11 and 12 and the slider 21 of the potentiometer which is normally at its midpoint is connected to ground through an ammeter 22. If there are no grounds in the network the voltage drops between the slider 21 and the lines 11 and 12 respectively are balanced and no current flows through the ammeter 22. In the event of a ground, however, such as for example a ground as at 23 in the element B of parallel branch 13, there would be a difference of potential between point 23 and the slider 21 and a current would flow through the ammeter 22 and would be registered thereon. The next step in the procedure is to move the slider 21 to the left as far as the vertical line 24 or vertical coordinate 24 passing through the point 23. This rebalances the potentials and the ammeter 22 would again indicate zero current. The position of the slider 21 relative to the potentiometer determines the location of the ground with reference to the midpoints of the parallel branches, that is it determines the distance of the ground from the terminals 11 and 12 but it does not determine in which parallel branch the ground may be.

It has now been determined by means of the potentiometer that the ground is nearer to the negative terminal, that is, line 12, than the positive, so the positive side, line 11 is connected to A. C. ground, through condenser 25. The ripple voltage now appears on terminal 12.

The next step in the procedure is to measure the amplitude of the ripple voltage developed at the commutator of generator 10 at the midpoint of each parallel branch, these midpoints being indicated by the numerals 28, 29, 30, 31 and 32. This measurement is made by means of a conventional oscilloscope which is used simply as a voltmeter to measure the amplitude of the ripple voltage at each of the points enumerated. The oscilloscope is indicated at 35 and it is employed in a known manner with the vertical deflection plates connected to ground as shown at 36 and to a contactor 37 which is brought into contact with each of the midpoints enumerated above. The ripple voltage at each of the enumerated points appears on the screen of the oscilloscope when the contactor 37 is brought into contact with the said points. With the positive side of the network grounded through the condenser 25, this side of the network being farthest from the vertical coordinate 24 as pointed out above, the ripple voltage developed in the generator 10 will appear on the negative terminal 12 and thus if there is a ground at point 23 in the parallel branch 13 the least or lowest value of ripple voltage will appear as being in the branch 13 when the contactor 37 is brought into contact with point 28. This establishes that the ground is in the parallel branch 13.

The next step in the procedure is to measure the distribution of the ripple voltage along the parallel branch 13. This is done by bringing the contactor 37 in contact with various points all along the branch 13 to determine the value, that is the amplitude of the ripple voltage therealong. The point where the ripple voltage drops to zero or substantially zero should occur at the coordinate 24, that is, at the point 23 and the amplitude of the ripple voltage between the point 23 and line 11 should be substantially or very nearly zero. If the point of zero ripple voltage as indicated by the oscilloscope 35 coincides with the coordinate 24 it established definitely that the ground is located in the element B of branch 13. If the elements A, B, C and D are not accessible at all points, that is, at every point along their lengths the ripple voltage may be measured at one terminal of each element and with the positive side of the line 11 grounded this would be the positive terminal of each element.

To further substantiate that the ground is located in the element B the D. C. potential to ground may be checked at each terminal of this element. The polarity should be opposite at the two ends of the element if the ground is in that element.

In the event that the zero or substantially zero value of ripple voltage as measured by the oscilloscope does not coincide with the vertical coordinate 24 the distribution of the ripple voltage is measured with the other side of the network, that is, with the negative side of the network 12 connected to ground through the condenser. If the point of zero or substantially zero ripple voltage now appears on the other side of the coordinate 24, that is, to the right of it, it indicates that there are two grounds in the branch 13 rather than only one. If the point zero or substantially zero ripple voltage comes near the coordinate 24 there is only one ground.

From the foregoing it is to be seen that my invention provides a simple and convenient means for locating a ground in circuits of the type described, the method requiring a minimum of equipment and operation.

The embodiment of my invention disclosed herein is representative of its preferred form. The disclosure is to be interpreted in an illustrative rather than a limiting sense, the scope of the invention being determined in accordance with the claims appended hereto.

I claim:

1. A method of locating a ground in a D. C. circuit energized from a D. C. generator which develops a ripple voltage at the commutator thereof comprising grounding one side of the circuit through a condenser and measuring the distribution of the ripple voltage in the circuit to find the point in the circuit where the ripple voltage drops substantially to zero due to the existence of a ground.

2. A method of locating a ground in a D. C. circuit network consisting of a circuit having a number of similar parallel branches which is energized from a D. C. generator which develops a ripple voltage at the commutator thereof comprising grounding one side of the parallel branches through a condenser and measuring the ripple voltage which is developed at the commutator of the generator at the midpoint of each parallel branch in order to find in which branch is the point of lowest ripple voltage.

3. A method of locating a ground in a D. C. circuit network consisting of a circuit having a number of similar parallel branches which is energized from a D. C. generator which develops a ripple voltage at the commutator thereof comprising grounding one side of the network through a condenser, measuring the ripple voltage at the midpoint of each parallel branch in order to find in which branch is the point of lowest ripple voltage and then measuring the distribution of the ripple voltage along the parallel branch in which the low point was found in order to determine the location in the said branch of the point at which the ripple voltage drops off to zero or substantially zero.

4. A method of locating a ground in a D. C. circuit network consisting of a circuit having a number of similar parallel branches which is energized from a D. C. generator which develops a ripple voltage at the commutator comprising locating the ground with reference to the midpoint of the parallel branches by connecting a potentiometer across the terminals of the network and connecting the slider of the potentiometer to ground through a current indicating instrument, adjusting the slider to right or left of the midpoint so as to cause the instrument to indicate zero current, connecting the terminal of the network which is farthest from the ground as thus indicated by the potentiometer to ground through a condenser and then measuring the ripple voltage at the midpoint of each parallel branch to find the branch in which is the point of lowest value of ripple voltage and then measuring the distribution of the ripple voltage along this branch to determine the point at which the ripple voltage drops off to zero or substantially zero due to the existence of a ground.

5. A method of locating a ground in a D. C. circuit network consisting of a circuit having a number of similar parallel branches which is energized from a D. C. generator which develops a ripple voltage at the commutator comprising locating the ground with reference to the midpoint of the parallel branches by connecting a potentiometer across the terminals of the network and connecting the slider of the potentiometer to ground through a current indicating instrument and adjusting the slider to right or left of the midpoint so as to cause the instrument to indicate zero current, connecting the terminal of the network which is farthest from the ground as thus indicated by the potentiometer to ground through a condenser and then measuring the distribution of the ripple voltage along each parallel branch to determine the point in the branch in which there is a ground at which the ripple voltage drops off to zero or substantially zero due to the existence of the ground.

6. A method of locating a ground in a circuit normally energized with D. C. current which comprises grounding one side of the circuit through a condenser, impressing a ripple voltage on the circuit and measuring the distribution of the ripple voltage in the circuit to find the point in the circuit where the ripple voltage drops substantially to zero due to the existence of a ground.

7. A method of locating a ground in a circuit network normally energized with D. C. current, the network consisting of a circuit having a number of similar parallel branches which consists in grounding one side of the network through a condenser, impressing a ripple voltage on the network and measuring the ripple voltage at the midpoint of each parallel branch in order to find in which branch is the point of lowest ripple voltage.

8. A method of locating a ground in a circuit network consisting of a circuit having a number of similar parallel branches normally energized with D. C. current comprising grounding one side of the network through a condenser, impressing a ripple voltage on the circuit, measuring the ripple voltage at the midpoint of each parallel branch in order to find in which branch is the point of lowest ripple voltage and then measuring the distribution of the ripple voltage along the parallel branch in which the low point was found in order to determine the location in said branch of the point at which the ripple voltage drops off substantially to zero.

9. A method of locating a ground in a circuit network consisting of a circuit having a number of similar parallel branches normally energized with D. C. current consisting in locating the ground with reference to the midpoint of the parallel branches by connecting a potentiometer across the terminals of the network and connecting the slider of the potentiometer to ground through a current indicating instrument, adjusting the slider to right or left of the midpoint so as to cause the instrument to indicate zero, connecting the terminal of the network which is farthest from the ground as thus indicated by the potentiometer to ground through a condenser, impressing a ripple voltage on the circuit, and then measuring the ripple voltage at the midpoint of each parallel branch to find the branch in which is the point of lowest value of ripple voltage, and then measuring the distribution of the ripple voltage along this branch to determine the point at which the ripple voltage drops off to zero or substantially zero due to the existence of a ground.

10. A method of locating a ground in a circuit network consisting of a circuit having a number of similar parallel branches normally energized with D. C. current consisting in locating the ground with reference to the midpoint of the parallel branches by connecting a potentiometer across the terminals of the network and connecting the slider of the potentiometer to ground through a current indicating instrument, adjusting the slider to right or left of the midpoint so as to cause the instrument to indicate zero, connecting the terminal of the network which is farthest from the ground as thus indicated by the potentiometer to ground through a condenser, impressing a ripple voltage on the circuit, and then measuring the distribution of the ripple voltage along this branch to determine the point at which the ripple voltage drops off to zero or substantially zero due to the existence of a ground.

References Cited in the file of this patent

UNITED STATES PATENTS

| | | |
|---|---|---|
| 353,915 | Bradley | Dec. 7, 1886 |
| 1,055,018 | Burnham | Mar. 14, 1913 |
| 1,695,719 | Rudenberg | Dec. 18, 1928 |
| 1,908,297 | Anderson | May 9, 1933 |
| 2,176,755 | Borden | Oct. 17, 1939 |
| 2,176,759 | Borden | Oct. 17, 1939 |